United States Patent [19]

Bauer et al.

[11] Patent Number: 5,083,084
[45] Date of Patent: Jan. 21, 1992

[54] DEVICE FOR CONTACTLESS MEASURING OF ROTATIONAL ANGLE OR ROTATIONAL SPEED

[75] Inventors: Hans-Peter Bauer, Ditzingen; Klaus Dobler, Gerlingen; Hansjörg Hachtel, Weissach, all of Fed. Rep. of Germany

[73] Assignee: Robert Bosch GmbH, Stuttgart, Fed. Rep. of Germany

[21] Appl. No.: 593,290

[22] Filed: Oct. 4, 1990

Related U.S. Application Data

[63] Continuation of Ser. No. 363,893, filed as PCT/DE87/00500, Nov. 6, 1987, abandoned.

[30] Foreign Application Priority Data

Dec. 13, 1986 [DE] Fed. Rep. of Germany ....... 3642678

[51] Int. Cl.⁵ .................. G01R 7/30; G01P 3/488
[52] U.S. Cl. ..................... 324/207.19; 324/207.22; 324/207.25; 324/173
[58] Field of Search ............. 324/173, 174, 163, 164, 324/166, 176, 226, 227, 238, 241, 207.15, 207.11, 207.17, 207.19, 207.22, 207.23, 207.25, 207.26; 310/155, 168

[56] References Cited

U.S. PATENT DOCUMENTS

| | | | |
|---|---|---|---|
| 2,293,502 | 8/1942 | Hermann | 324/207.19 X |
| 2,864,997 | 12/1958 | Von Basel | 324/207.11 X |
| 3,187,314 | 6/1965 | Neergaard | 324/173 X |
| 3,297,940 | 1/1967 | Mulligan et al. | 324/173 X |
| 3,641,429 | 2/1972 | Cox, Jr. et al. | 324/207.19 |
| 3,742,340 | 6/1973 | Kiedrowski | 324/208 X |
| 3,786,459 | 1/1974 | Berger | 324/208 X |
| 3,961,243 | 6/1976 | Schulz | 324/207.19 |
| 4,223,300 | 9/1980 | Wiklund | 324/208 X |
| 4,752,732 | 6/1988 | Van Schoiack et al. | 324/208 |
| 4,754,642 | 7/1988 | Miyairi et al. | 324/173 X |
| 4,764,767 | 8/1988 | Ichikawa et al. | 324/208 |

FOREIGN PATENT DOCUMENTS

| | | | |
|---|---|---|---|
| 0029682 | 6/1981 | European Pat. Off. | |
| 0182322 | 5/1986 | European Pat. Off. | |
| 86/04731 | 8/1986 | PCT Int'l Appl. | |
| 937992 | 6/1982 | U.S.S.R. | 324/207.22 |
| 0924714 | 5/1963 | United Kingdom | 324/207.22 |
| 1135497 | 12/1968 | United Kingdom | 324/207.22 |
| 2065897 | 7/1981 | United Kingdom | |

Primary Examiner—Kenneth A. Wieder
Assistant Examiner—Warren S. Edmonds
Attorney, Agent, or Firm—Michael J. Striker

[57] ABSTRACT

In a measurement device for contactless determination of the rotation angle and/or rotation speed, a disk is fastened on a shaft so as to be fixed with respect to rotation relative to it. During the measurement process, layers of material with good electrical conductivity which are arranged on one or both opposing sides of the disk are moved relative to receiver coils located on opposite sides of the disk (16a and 16b). The measurement device can work according to the eddy current measurement method, as well as according to the inductive method. In order to compensate for measurement errors, the conductive layers are arranged at approximately equal distances (a, b) between two coils. In addition, the greatest possible quantity of measurement points can be used for forming an average.

10 Claims, 5 Drawing Sheets

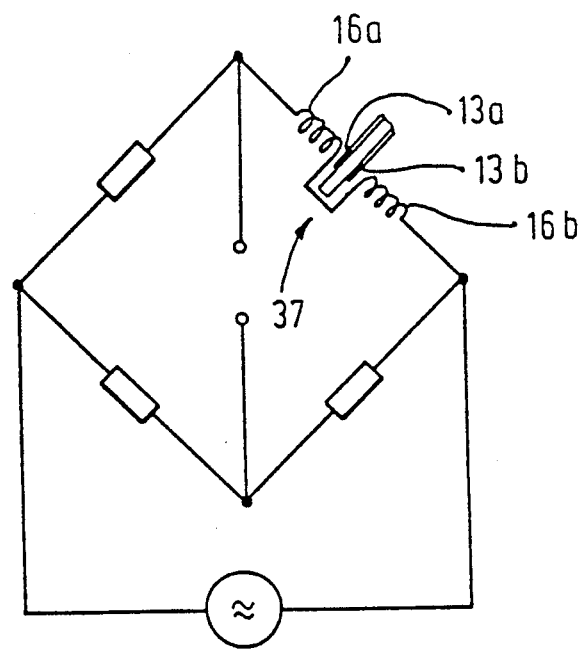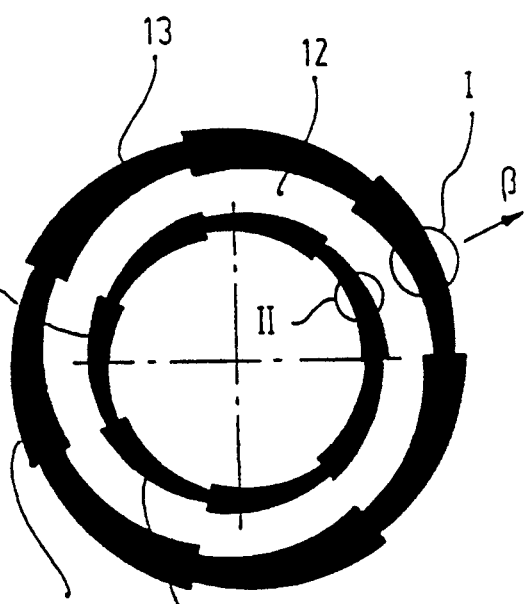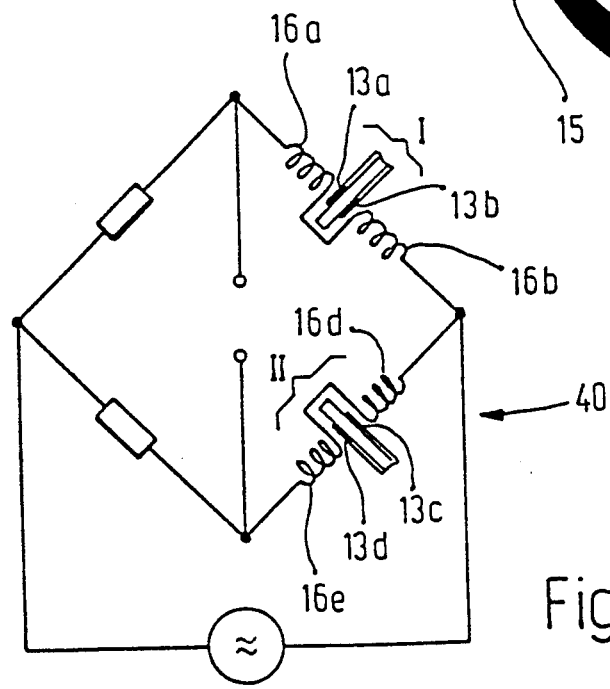

DEVICE FOR CONTACTLESS MEASURING OF ROTATIONAL ANGLE OR ROTATIONAL SPEED

This application is a continuation of application Ser. No. 363,893, filed as PCT/DE87/00500, Nov. 6, 1987, now abandoned.

BACKGROUND OF THE INVENTION

The invention relates to on a measurement device for contactless determination of a rotation angle and/or rotation speed by means of an eddy current sensor. A measurement device in which the rotation angle is determined by means of an eddy current sensor is already known. In so doing, regions of electrically conductive material, in which eddy currents are produced by a sensor coil through which alternating current flows, are arranged on a disk. Accordingly, the impedance of the coil and the voltage applied to the coil are changed. Since the ratio which can be realized between the surface increase and the angle increase is relatively small, a high accuracy of the measurement signal is required. In particular, the measurement error propagates when the pathdependent measurement signal is transformed into the corresponding speed or acceleration signal by means of subsequent differentiation. In addition, bearing tolerances and wobbling movements of the rotor lead to measurement errors.

SUMMARY OF THE INVENTION

Accordingly, it is an object of our invention to provide a measurement device for a rotation angle and/or rotation speed of a stationary or rotating shaft which produces measurement signals of improved accuracy.

It is also an object of our invention to compensate for measurement errors caused by radial and axial movement of a measurement body of the measurement device and to eliminate interfering influences from the environment, e.g. temperature.

It is a further object of our invention to reduce errors brought about by contour inaccuracies of segments of electrically conductive material on the measuring body.

In keeping with the above objects and with others which will become apparent hereinafter, the measurement device for contactless determination of a rotation angle and/or rotation speed of a stationary or rotating shaft comprises a disk body having two axial opposing sides, which is approximately concentric relative to the shaft and is fixed on the shaft with respect to rotation relative to the shaft and on which at least one continuously extending region of electrically conductive material is applied along a rotation direction. The continuously extending region is in working connection with at least one sensor coil which is positioned so as to be fixed in position relative to the disk body. It further comprises an electronic evaluating circuit for measuring the change in impedance of the sensor coil. The region or regions comprises at least one segment-like portion which uniformly and continuously widens in a rotational direction. At least one of the sensor coils is provided on each of the opposing sides, the sensor coils being part of the electronic evaluating circuit.

Additional resistors, capacitors and alternating voltage sources are provided in the electronic evaluating circuit to form filter circuits and advantageously a bridge circuit containing the sensor coils so that a practically linear characteristic line is produced for determination of the rotation angle and/or rotation speed.

Advantageously the sensor coils are positioned in pairs with each member of a pair on opposing sides of the body positioned coaxially and connected in series. Errors are minimized particularly if a sensor coil is associated with each segment-like portion of the electrically conductive regions and all the sensor coils are connected in series in the bridge circuit. Alternatively all the coils on one side of the disk may be connected in series and then all coils so connected on one side are connected in parallel or series with all the coils on the other side. Regions of the electrically conductive material positioned on opposite sides of the diskbody are advantageously congruent or superposable. The sensor coils can have a circular, oval or rectangular geometry.

BRIEF DESCRIPTION OF THE DRAWINGS

The invention is shown in the drawing and described in more detail in the following description. FIGS. 2 and 3 are blockdiagram; FIG. 4 is a view similar to that of FIG. 1a of another embodiment of disc body; FIG. 5 is a block diagram of a device with disc body of FIG. 4.

DETAILED DESCRIPTION OF THE PREFERRED EMBODIMENTS

Figure 1:
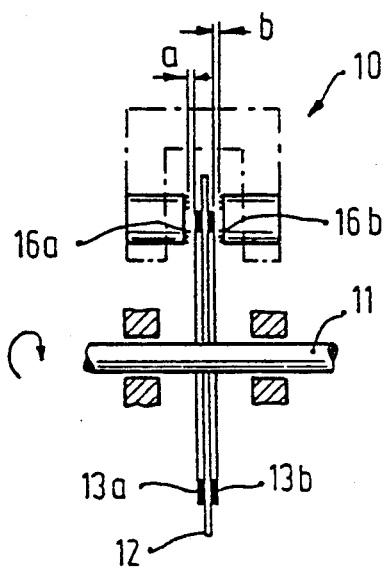
FIG. 1 is a longitudinal cross-sectional view of a measurement device according to the invention.

A measurement device 10 for contactless determination of the rotation angle and/or rotation speed of a shaft 11 is shown in FIG. 11. A round disk 12 is fastened on the shaft 11 so as to be fixed against rotation relative to it. Instead of a disk 12, a body with a desired different shape can also be used, wherein, however, it should have a construction which is as flat and light-weight as possible. The disk 12 comprises material which is not electrically conductive, e.g. a plastic material. The two layers 13a and 13b of material with good electrical conductivity are applied to the two axial sides of the disk 12 so as to be congruent; each layer 13a and 13b comprises a circular band 14. Each layer 13a and 13b comprises segment-like portions 15 shaped like truncated arrowhead widening or narrowing continuously in one rotational direction. With more than one segment-like portion, all segment-like portions are equal, following each other in rotational direction. The portions 15 are uniformly distributed in the circumferential direction of the disk 12. The layers 13a and 13b can be electroplated on, applied in thick- or thin-film technology, evaporated on, or glued on. An inversion is also possible, i.e. the layers 13a and 13b are etched out of a material with good electrical conductivity and therefore have non-conductive properties. A coil 16a and 16b, respectively, is located opposite the two front sides of the disk 12 in the region of the layers 13a and 13b, respectively, the two coils being stationary in space with high-frequency alternating current flowing through them. The distance a and b, respectively, between the coils 16a and 16b, respectively, and the electrically conductive layers 13a and 13b, respectively, is to be designed so as to be as constant as possible along the entire rotational region and so as to be of approximately the same magnitude at both front sides. The coils 16a and 16b on the two opposing sides can also be wound in such a way that the magnetic fields change reciprocally. It is sufficiently to apply the conductive layer 13c to only one side of the disc 12 as shown in FIG. 1b. The conductive layer 13c must be positioned approximately centrally between the coils 16a, 16b, as can be seen from FIG. 1b. Physically, the disk 12 then acts approximately like air.

Figure 2:
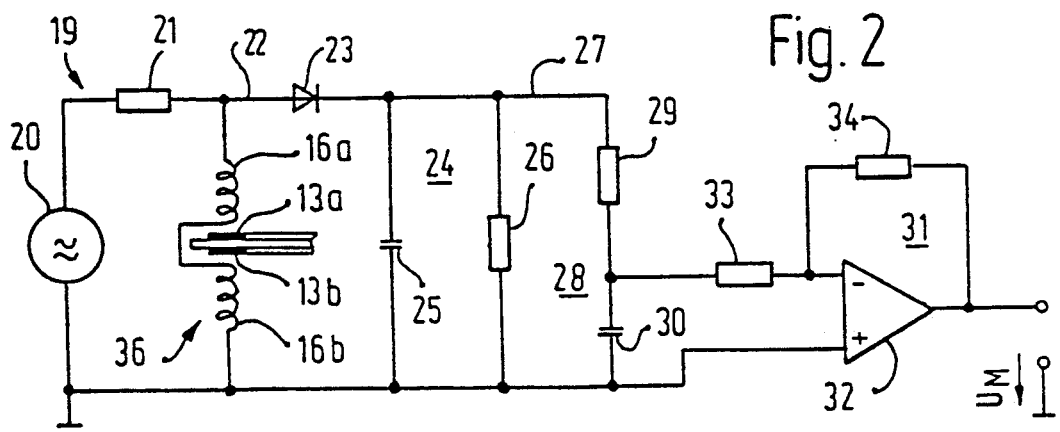

The two coils 16a and 16b are connected in an electronic evaluating circuit 19 shown in FIG. 2. An alternating voltage generator 20 feeds the coils 16a and 16b with an alternating voltage via a series resistor 21. A sensor signal 22 can be taken off at the coils 16a and 16, which sensor signal 22 is fed via a diode 23, a filter circuit 24 comprising a filter capacitor 25 and a bleeder resistor 26. The filtered signal voltage 27 reaches an amplifier arrangement 31 via a low-pass filter 28 formed from a resistor 29 and a capacitor 30. The amplifier arrangement 31 is constructed as an inverting operational amplifier circuit 32 whose amplification factor is adjustable with the two resistors 33, 34. The two coils 16a and 16b can be connected with one another in a voltage divider circuit 36 or, as is shown in FIG. 3, in a so-called half-bridge circuit or in a branch of a Wheatstone bridge 17.

When alternating current flows through the two coils 16a and 16b the magnetic field in the electrically conductive layers 13a and 13b produces eddy currents The greater the surface area of these layers 13a, 13b which is penetrated by the magnetic field, the more eddy currents are produced Because of the increased production of eddy currents, the alternating-current resistance is reduced, which causes a reduction of the voltage applied to the coils. When the disk 12 rotates in the direction of the arrow the surface of the layers 13a and 13b increases because of the portions 15 and decreases again suddenly when the steeply falling flanks of the portions 15 are reached. Accordingly, the magnitude of the produced eddy currents also changes.

The disk 12 is to be arranged between the two coils 16a and 16b in such a way that eddy currents are produced in the same order of magnitude. In addition, the layers 13a and 13b are to be applied to both front sides of the disk 12 so as to be as congruent as possible. If the disk 12 is displaced in the axial direction, e.g. because of the bearing play of the shaft 11 between the two coils 16, the respective resistance value of the two coils 16a, 16b is changed because of the eddy current effect. If, e.g. the distance a is reduced, the resistance value of the coil 16a is reduced because of an increase of the produced eddy currents in the layer 13a. At the same time, the increase of the distance b, which results in a compulsory manner, effects a reduction of the eddy currents produced in the layer 13b and accordingly an increase in the resistance value of the coil 16b. In an optimal identical design of the layer width of the distance a, particularly of the coil dimensions, these changes in the alternating-current resistance are approximately of the same magnitude and change reciprocally to a great extent.

Figure 1A:
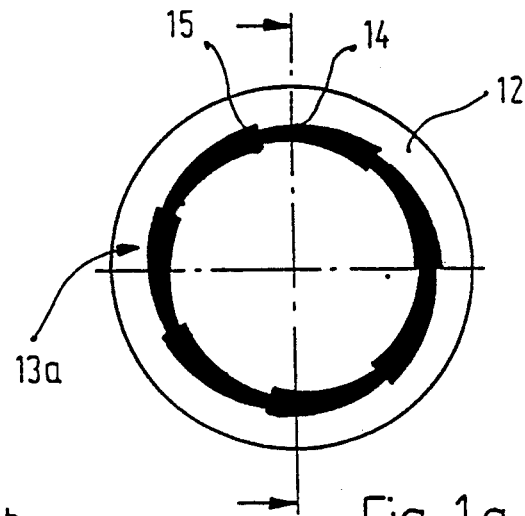
FIG. 1a is a/side view of a disc body of the device of FIG. 1.
Figure 1B:
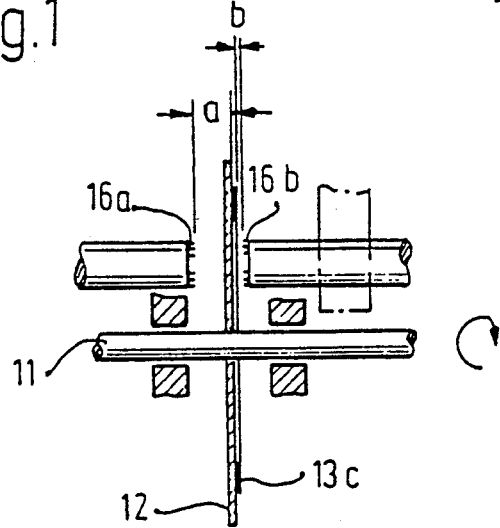
FIG. 1b is a longitudinal cross-sectional view of another embodiment of the measurement device according to the invention.

A modification of the embodiment shown in FIG. 1a, is shown in FIG. 4. Two additional layers 13d and 13e having a smaller radius are applied to the disk 12 on both opposing sides to be superposable. The portions 15a of the two layers 13d, 13e run in the opposite direction relative to the portions 15. Every layer 13d and 13e is, in turn, assigned its own coil 16d, 16e as shown in FIG. 5. The coils 16a and 16b, as well as 16d and 16e, are connected with one another in a bridge circuit 40. The coils assigned to the layers 13a, 13b form one of the two active bridge branches of the bridge circuit 40. The same applies to coils assigned to layers 13d and 13e. For the purpose of illustration, the measurement points are designated by I and II, respectively, in FIGS. 4 and 5.

Figure 6:
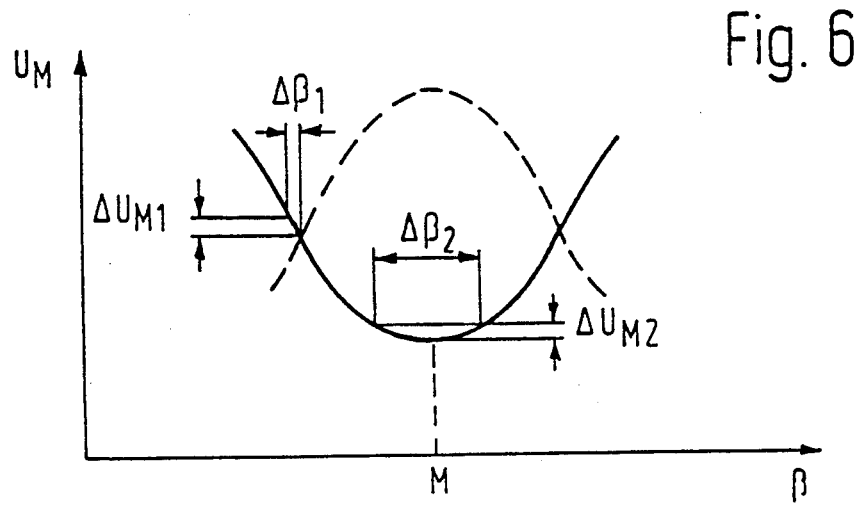
FIG. 6 is a graphical illustration for the measurement error.

The curve of the measurement voltage $U_M$ during a radial displacement of the disk 12 in direction $\beta$ is plotted in FIG. 6, wherein the coils are to be arranged approximately in the center of the segments. It can be seen that during an identical radial displacement $\beta$ the measurement error $\Delta U_{M2}$ of the curve, which accordingly results at the occurring in other portions of the curve. A maximum of the $\Delta U_{M1}$ curve does not occur, since the disk is then already located outside the measurement region of the coils 16a, 16b, 16d, 16e.

Figure 7:
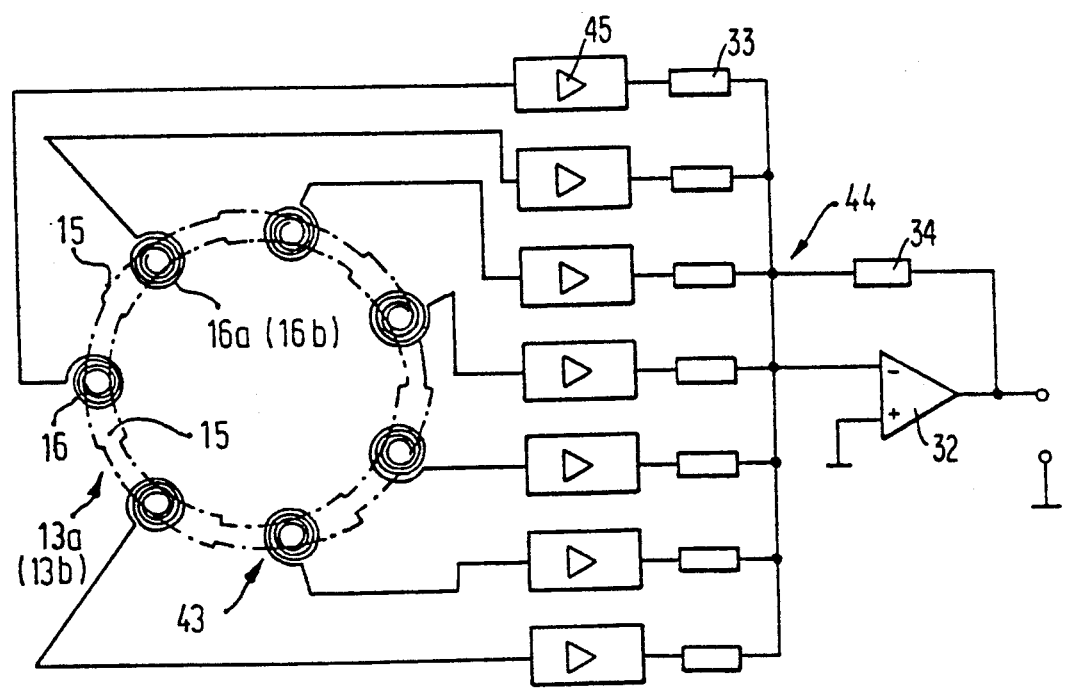
FIGS. 7 to 9 are circuit diagram of another embodiments of the device according to the invention.

Moreover, measurement errors occur because of an inaccuracy in the contours of the layers 13a and 13b. The most accurate possible measurement signals are required in particular in a further processing of the measurement signal to form a speed or acceleration signal means of differentiation. For this purpose, the most exact possible construction of the contours of the layers, the layer thickness, and the flattest possible surface and a uniformly conductive layer are necessary. These errors can be suppressed to a great extent when measurements are taken on both opposing sides simultaneously with a plurality of coils 16 per layer 13, as shown in FIG. 7. A plurality of portions 15 of the layers 13 are accordingly detected. In so doing, it is necessary that the coils of the respective layers be arranged spatially at the same place in the portions 15. Due to the laws of probability, these incidental different inaccuracies in contour are eliminated when there is the greatest possible quantity of measurement points. The measurement signal is formed by means of an addition of the individual signals of the measurement points 43 or by means of subsequently forming an average in an evaluating circuit 44.

Figure 8:
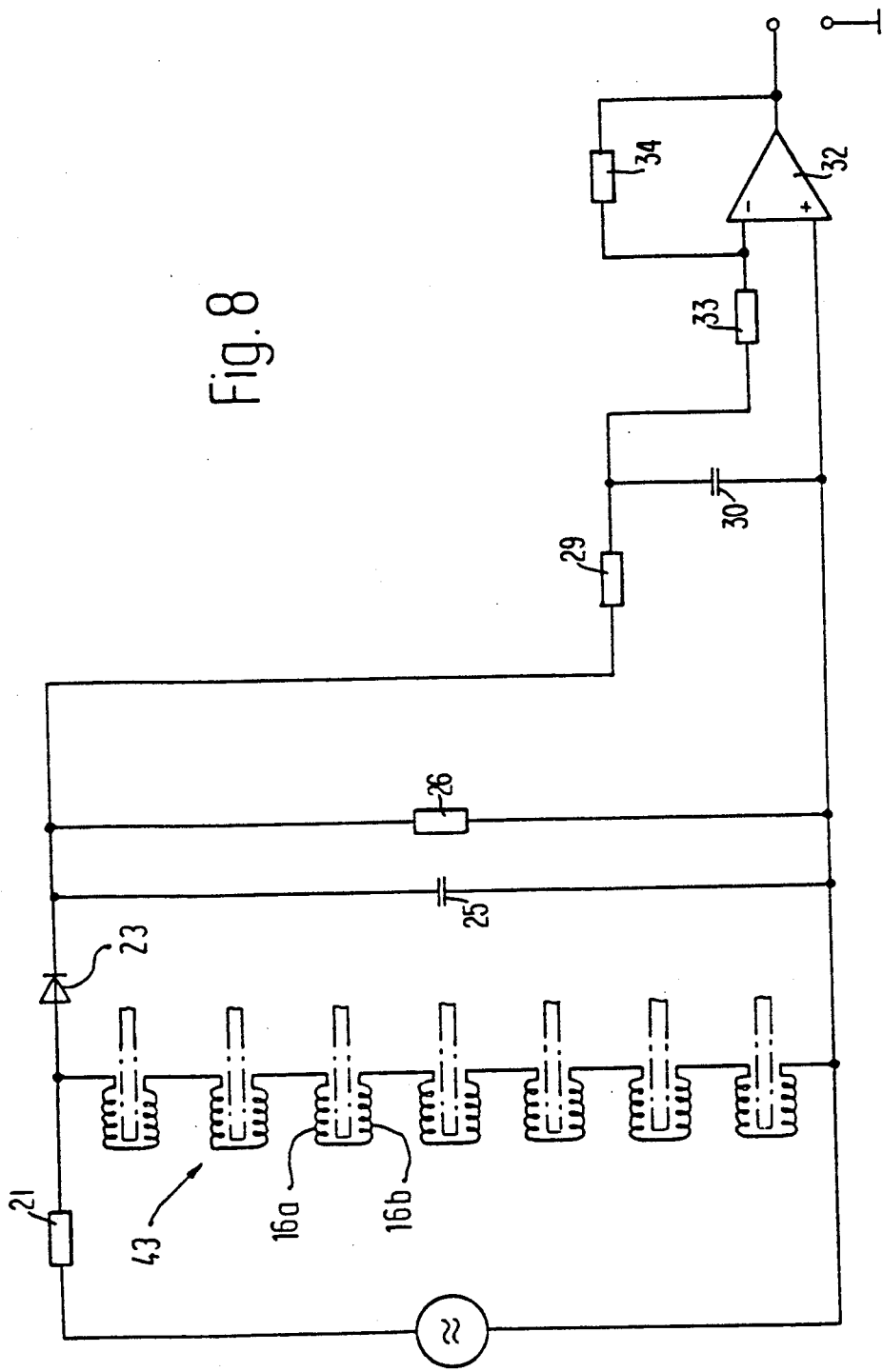
Figure 9:
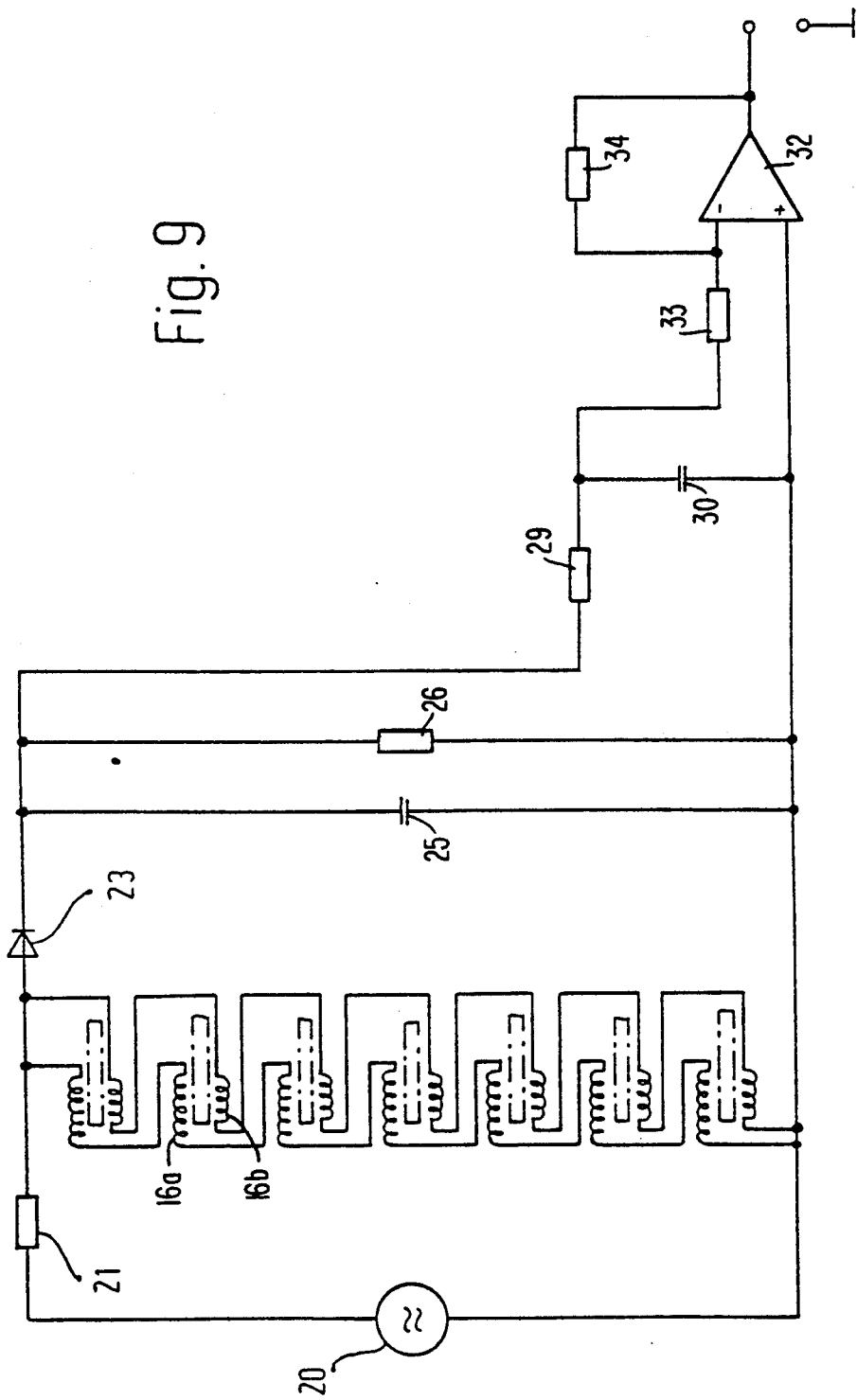

For the purpose of adding these signals of the measurement points 43, a modification of the circuit 19 according to FIG. 2 is shown in FIG. 8. All coils 16a and 16b of every measurement point 43 of the two opposing sides of the disk 12 are connected in series with one another. The measurement signal which accordingly results is further processed as shown in FIG. 3. In FIG. 7, the coils of the measurement points 43 of one side are connected in series with one another. The groups of coils of the two opposing sides are subsequently connected in series or parallel to one another, as shown in FIG. 9.

Of course, it is also possible that the measurement device, and accordingly the coils 16 and the layers 13, are operated according to the inductive process. The same relations apply in a corresponding sense. In this case, instead of the conductive surfaces, ferromagnetic layers then occur as segments. Of course, the electrically conductive segments 13 must then consist of ferromagnetic material. The curve shown in dashes in FIG. 6 then results.

While the invention has been illustrated and described as embodied in a contactless measuring device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for contactless measuring at least one of rotational angle and a rotational speed of a shaft which is in one of stationary and rotational conditions, said device comprising a disk body fixedly and coaxially supported on said shaft for joint rotation therewith and having two opposing axial sides, at least one of said two axial opposing sides having a continuously extending concentric region formed of an electrically conductive material and comprising at least one uniformly widening segment, said disc body being formed of material which is different from the electrically conductive material said continuously extending concentric region is formed of; at least two sensor coils connected to an AC power source and arranged coaxially relative to each other on said two opposing sides, respectively, in a fixed position with respect to said disk body and operatively associated with said region of an electrically conductive material, each of said two sensor coils having an impedance which varies in accordance with a size of an area of said region of an electrically conductive material each of said two sensor coils are operatively associated with; and an evaluating circuit for measuring variations of the impedance of said two sensor coils to thereby measure the at least one of the rotational angle and the rotational speed by adding signals form said two sensor coils, all elements of said evaluating circuit being so selected that a substantially linear characteristic line is obtained for determining the at least one of the rotational angle and the rotational speed.

2. A device as set forth in claim 1, wherein said continuously extending region of an electrically conductive material comprises a plurality of successively arranged identical uniformly widening segments, each of said plurality of identical uniformly widening segments having a more wider portion that forms a front end of a segment when the shaft is rotatable in a clockwise direction, and a rear end of the segment when the shaft is rotatable in a counterclockwise direction.

3. A device as set forth in claim 2, wherein another of said two axial opposing sides of said disc body is provided with a continuously extending concentric region formed of an electrically conductive material, having a radius which is equal to a radius of said region of an electrically conductive material of said at least one of said two axial opposing sides, and comprising a plurality of uniformly widening segments symmetrically arranged with respect to the plurality of segments of said region of an electrically conductive material of said at least one of said two opposing sides.

4. A device as set forth in claim 3, wherein each of said two opposing axial sides has another continuously extending concentric region of an electrically conductive material having a radius which is smaller than the radius of said at least one region of an electrically conductive material, said device further comprising two additional sensor coils arranged coaxially relative to each other on said two axial opposing sides, respectively, in a fixed position with respect to said disk body and each operatively associated with a respective another region of an electrically conductive material whereby two sensor coils operatively associated with two continuously extending concentric regions having different radii and formed on each of said two opposing axial sides, are arranged on each of said two opposing axial sides.

5. A device as set forth in claim 4, wherein each of said another region of an electrically conductive material comprises a plurality of uniformly widening segments, the uniformly widening segments of two regions of a respective opposing side widening in opposite directions with respect to a rotational direction of said disc body.

6. A device as set forth in claim 4, wherein the two sensor coils on each of said two opposing axial sides are connected in series with each other and parallel to the two sensor coils on another of said two opposing axial sides.

7. A device as set forth in claim 4, wherein the two sensor coils arranged on the one of said two opposing axial sides and the two sensor coils arranged on the another of said two opposing axial sides are connected in series with one another.

8. A device as set forth in claim 4, wherein said evaluating circuit includes a bridge circuit, the two sensor coils arranged on the one of said two opposing axial sides and the two sensor coils arranged on the another of said two opposing axial sides forming parts of said bridge circuit.

9. A device as set forth in claim 1 wherein said sensor coils have a geometry that is one of circular, oval, and rectangular.

10. A device as set forth in claim 1 wherein said evaluating circuit includes a bridge branch, said at least two sensor coils being seriesly connected in said bridge branch.

* * * * *